Aug. 10, 1965  F. W. HEINKEL  3,199,487
VEHICLE GUIDE
Filed May 4, 1964
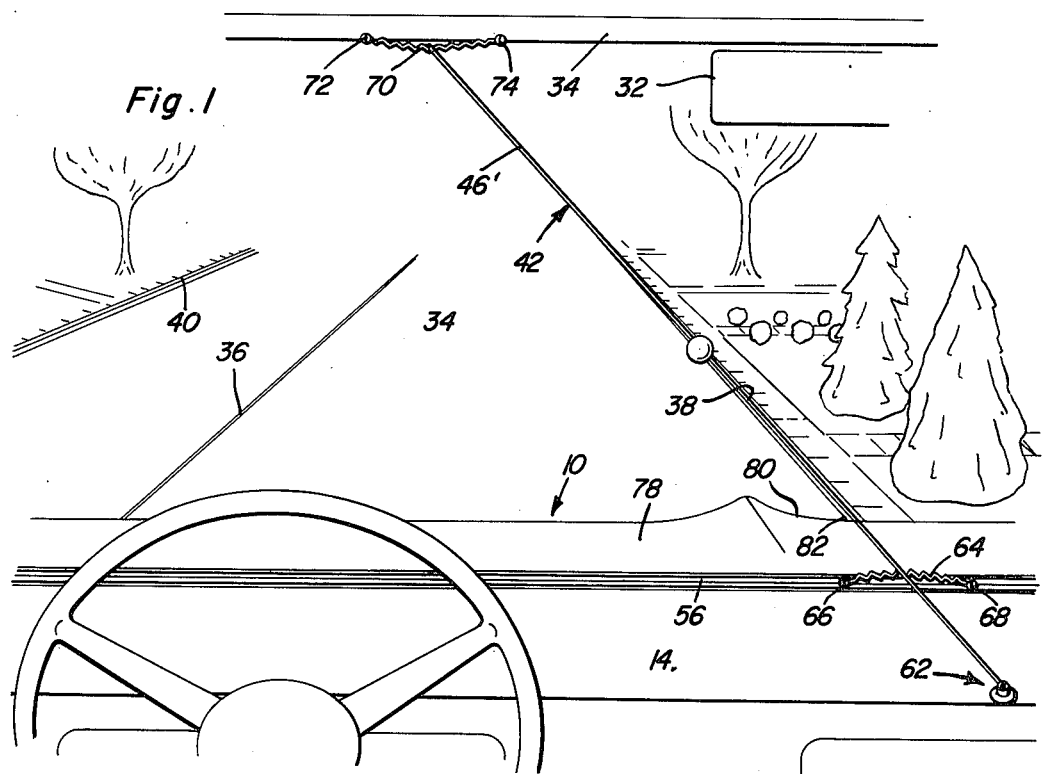
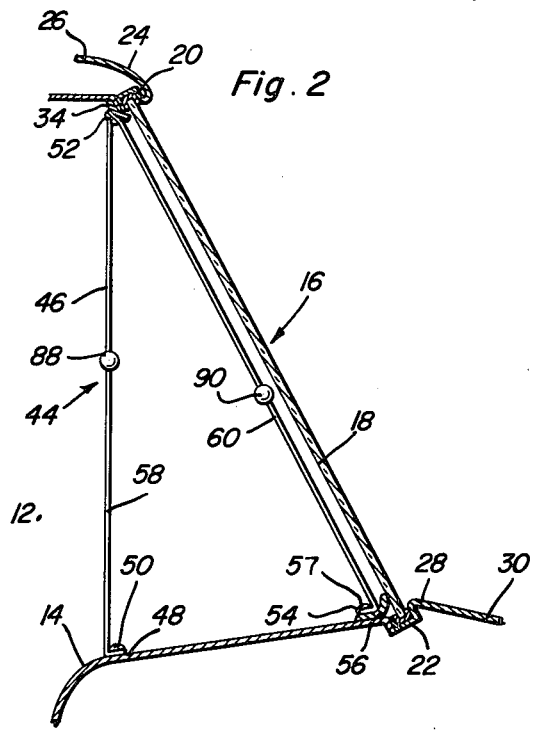
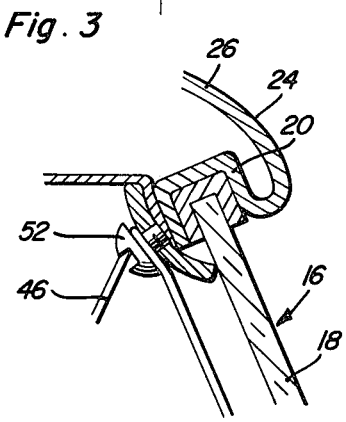
Frederick W. Heinkel
INVENTOR.
BY *Clarence A. O'Brien*
and *Harvey B. Jacobson*
Attorneys 3,199,487
VEHICLE GUIDE
Frederick W. Heinkel, 2053 E. Wood St., Decatur, Ill.
Filed May 4, 1964, Ser. No. 364,730
7 Claims. (Cl. 116—28)

This invention relates to a novel and useful vehicle driving guide and more specifically to an apparatus designed primarily for indicating to the driver of a vehicle when his vehicle edges close to one side of the roadway along which the vehicle is traveling.

In addition, the driving guide of the instant invention may also be utilized as a means to indicate to the driver of the vehicle when the vehicle is positioned in parallel relationship to one side of the roadway on which the vehicle is disposed. Because of its novel construction, the vehicle guide of the instant invention is capable of indicating when the vehicle generally parallels one side edge of the roadway even when the vehicle is standing still as well as when the vehicle is moving either forwardly or rearwardly.

The vehicle guide of the instant invention includes a pair of upstanding thin guide members which are horizontally spaced apart at least at their mid-portions and adapted to be supported from a vehicle forwardly of and slightly to one side of the driver's position of the vehicle with the guide members defining an upstanding plane extending generally longitudinally of the vehicle and inclined transversely of the vehicle at an inclination corresponding to the inclination of the adjacent side of the roadway on which the vehicle is disposed as seen from the driver's position. In this manner, the thin guide members are supported so as to appear superimposed along one side edge of the roadway as that side edge of the roadway is viewed by the driver of the vehicle. With this type of guide the driver of the vehicle may determine when he is disposed closer to the side of the roadway than the preset distance determined by the position of the vehicle guide and may also be utilized to indicate when the vehicle is substantially paralleling the side of the roadway.

Although the vehicle guide of the instant invention has hereinbefore been set forth as being adapted to be mounted in a position disposed slightly forwardly of the driver's position of the vehicle and to one side thereof, the vehicle guide may also be disposed on the other side of the vehicle for alignment with the other side of the roadway as well as adjacent the rear window of the vehicle for use when the vehicle is being backed up. Alternatively, if the vehicle is provided with a forwardly projecting hood, the forwardmost extremity of the hood, as seen by the driver of the vehicle, may be used in combination with the aforementioned plane defined by the vehicle guide for determining a predetermined forwardly and downwardly inclined line of sight intersecting with the edge of the roadway at a point spaced a predetermined distance forwardly of the vehicle.

The main object of this invention is to provide a vehicle guide adapted for use on substantially all types of motor vehicles and operable to establish a predetermined guide line along which the driver of the vehicle may direct his vision and which, in combination with the side of the roadway along which the driver's vehicle is traveling, will establish a predetermined distance between the side of the vehicle remote from the driver and the adjacent side of the roadway.

Another object of this invention, in accordance with the immediately preceding object, is to provide a vehicle guide including means whereby the guide itself, independently of any other portion of a vehicle on which it is mounted, may be used to indicate a predetermined distance between a vehicle and the edge of a roadway on which the vehicle is traveling.

Yet another object of this invention is to provide the vehicle guide of the instant invention with novel mounting means constructed in a manner whereby the vehicle guide will be adapted for mounting in substantially all types of motor vehicles.

A further object of this invention is to provide a vehicle driving guide in accordance with the preceding objects including means by which the aforementioned line of sight may be determined by sight members mounted on the spaced upstanding guide members of the vehicle guide and therefore be adjustable to suit each individual driver of the vehicle.

A final object of this invention to be specifically enumerated herein is to provide a vehicle driving guide in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a typical scene as seen with the central vision of the driver of a motor vehicle and showing the vehicle guide of the instant invention operatively mounted in the motor vehicle from the dashboard and roof thereof and with the upright guide members of the vehicle guide superimposed along the righthand side of the roadway on which the vehicle is disposed as seen by the driver;

FIGURE 2 is a fragmentary longitudinal vertical section view taken substantially upon a plane passing through the dashboard of the vehicle at a point spaced slightly to the right of the centerline of the vehicle and showing a modified form of vehicle guide mounted in an operative position from the dashboard and roof of the vehicle; and FIGURE 3 is a fragmentary enlarged vertical sectional view similar to the upper portion of FIGURE 2 and more clearly illustrating the manner in which the upper portion of the modified form of vehicle guide may be supported from the roof of the associated vehicle.

Referring now more specifically to the drawings the numeral 10 generally designates a conventional form of motor vehicle including a driver's compartment 12 in which a dashboard 14 is disposed. The vehicle 10 includes a front windshield assembly generally referred to by the reference numeral 16 having a windshield element 18 supported in upper and lower opposing channels 20 and 22, respectively, defined by the forward portion 24 of the vehicle top 26 and the rear portion 28 of the vehicle cowling 30.

The conventional rear vision mirror 32 is supported from the upper windshield molding 34 in any convenient manner and it may be seen from FIGURE 1 of the drawings that the vehicle 10 is disposed on a roadway 34 including a center marking line 36 and right and lefthand curbings 38 and 40.

The structural features of the vehicle guide of the instant invention may best be seen from a comparison of FIGURES 1 and 2 of the drawings wherein two forms of the vehicle guide are generally designated by the reference numerals 42 and 44, respectively. The vehicle guide 44 includes a single elongated guide 46 having one end secured to the dashboard as at 48 by means of a suitable fastener 50. The elongated guide 46 projects upwardly from the fastener 50 and is passed about a second fastener 52 which is secured to the upper windshield frame molding 34. The end of the elongated guide 46 remote from the fastener 50 then passes downwardly and is secured as at 54 to the lower windshield frame molding 56 by means of a fastener 57.

The elongated guide 46 therefore defines a pair of upstanding guide members 58 and 60 which are secured between the forward portion 24 of the roof 26 and the dashboard 14.

The vehicle guide 42, FIGURE 1, defines an elongated guide 46' which is substantially identical to the elongated guide 46 and has one end secured to the dashboard 14 by means of a suction cup assembly generally referred to by the reference numeral 62. The other end of the elongated guide 46' is slidably engaged with the mid-portion of an expansion spring 64 whose opposite ends are secured to the molding 56 by means of fasteners 66 and 68, the expansion spring 64 generally paralleling the molding 56. In addition, the mid-portion of the elongated guide 46' is entrained over and slidably engaged with the mid-portion of a second elongated expansion spring 70 whose opposite ends are secured to the upper windshield frame molding 34 at points spaced longitudinally therealong by means of fasteners 72 and 74.

The vehicle guide 44 is inclined transversely of the vehicle 10 in the same manner in which the vehicle guide 42 is inclined at its upper end toward the lefthand side of the vehicle 10. The upstanding guide members 46' defined by the elongated guide 42 and correspond to the guide members 58 and 60 are of course spaced apart longitudinally of the vehicle 10 intermediate their opposite ends and define a plane which, when the vehicle 10 is disposed in generally parallel relationship to the curbing 38 and spaced slightly outwardly therefrom, contains the curbing 38 as seen by the driver at the vehicle 10 and therefore enables the two guide members 46' of the elongated guide 42 to be superimposed along the curbing 38. The driver (not shown) of the vehicle 10 may of course readily observe when his vehicle is not disposed in parallel relationship to the curbing 38 and may also readily observe when his vehicle 10 is spaced laterally from the curb a distance other than the predetermined distance which will enable the guide members 46' of the elongated guide 42 to be superimposed on the curbing 38 in the line of vision of the driver of the vehicle.

In addition to being positioned as illustrated in FIGURE 1 of the drawings, similar vehicle guides may be oppositely inclined and spaced to the left of the driver of the vehicle 10 for properly indicating the lateral spacing of the vehicle 10 from the centerline 36 or the curbing 40. Still further, the vehicle guides similar to the vehicle guides 42 and 44 may be operatively positioned adjacent the rear window of the vehicle in order that these rear vehicle guides may be utilized to assist the driver of the vehicle in driving his vehicle rearwardly.

Inasmuch as the end of the elongated guide 46' and the mid-portion of the latter are supported from the moldings 56 and 34 by means of the expansion springs 64 and 70, it may be seen that the vehicle guide 42 may be adjusted to suit individual drivers of the vehicle.

With attention now directed more specifically to FIGURE 1 of the drawings it may be seen that the forwardmost portion of the hood 78 of the vehicle 10 defines a hood line 80, which when registered with the elongated guide 46' will establish a point along the curbing 38 spaced a predetermined distance forwardly of the vehicle 10.

By knowing the known distance between the point on the curbing defined by the line of sight of the driver of the vehicle passing through the intersecting points of the elongated guide 46' and the hood line 80, the driver of the vehicle may very accurately determine the distance of an object along the curbing 38 disposed adjacent the point 82. Should this point 82 be disposed 20 or 25 feet forwardly of the vehicle 10, it may be conveniently utilized by the driver of the vehicle 10 to accurately determine whether he is parked far enough from an intersection or a traffic control sign. Still further, the line of sight determined by the relative positions of the driver's eye and the hood line lying in the plane in which the elongated guide members 58 and 60 are disposed may be also determined by means of the sight members 88 and 90 mounted on the guide members 58 and 60 for adjustment longitudinally thereof and frictionally retained in adjusted position therealong. In this manner a predetermined line of sight may be adjusted as desired and utilized to indicate various types of distances such as parking distances as hereinbefore set forth or braking distances for any given speeds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle including a driver's position and means defining a windshield assembly forwardly of said position, a vehicle driving guide for indicating to the driver of said vehicle when his vehicle edges too close to one side of the roadway along which the vehicle is traveling, said guide comprising a pair of upstanding thin guide members horizontally spaced apart at least at their mid-portions and supported in said vehicle inwardly of said windshield assembly and forwardly of and to one side of said position with said guide members defining an upstanding plane extending therebetween and generally longitudinally of said vehicle and slightly forwardly inclined toward said one side of said vehicle and upwardly inclined toward the other side of said vehicle whereby said plane is adapted to define a predetermined inclined line of sight superimposed upon said one side of said roadway.

2. The combination of claim 1 wherein said upstanding guide members are upwardly convergent.

3. The combination of claim 2 wherein said guide members are joined together at their upper ends, so as to define a single point at the upper ends thereof and are secured to the upper marginal portion of said windshield assembly.

4. The combination of claim 1 including a pair of line of sight defining members on said guide members adapted to define a single line of sight disposed in said plane.

5. The combination of claim 1 including at least one elongated elastomeric tension member secured to transversely spaced portions of the upper marginal edge portion of said windshield assembly and from whose approximate mid-portion the upper ends of said guide members are supported.

6. The combination of claim 1 including a second elongated elastomeric tension member from whose approximate mid-portion the lower end of one of said guide members is connected, the opposite end portions of said second tension member being secured to transversely spaced portions of the lower marginal edge portion of said windshield assembly.

7. The combination of claim 6 wherein said tension members and said guide members include coacting connecting means connecting said guide members to said tension members for adjustable positioning of said guide members longitudinally of said tension members.

(References on following page)

References Cited by the Examiner

UNITED STATES PATENTS

| | | | |
|---|---|---|---|
| 1,429,166 | 9/22 | Rommer | 33—46.1 |
| 1,754,014 | 4/30 | Fowler | 33—46.1 |
| 1,782,992 | 11/30 | Johnson | 33—46.1 |
| 1,871,532 | 8/32 | Kenna | 33—46.1 |
| 2,553,963 | 5/51 | Dzus | 33—46.1 |
| 2,584,777 | 2/52 | Adolfson | 33—46.1 |
| 2,706,462 | 4/55 | Evans | 116—28 |
| 2,960,772 | 11/60 | Robins | 33—64 |

FOREIGN PATENTS 567,714  10/57  Italy.

LOUIS J. CAPOZI, *Primary Examiner.*